(12) United States Patent
Sato

(10) Patent No.: US 12,071,224 B2
(45) Date of Patent: Aug. 27, 2024

(54) AIRCRAFT BOUNDARY LAYER INGESTION USING MULTIPLE FANS AND ASSOCIATED METHODS

(71) Applicant: The Boeing Company, Chicago, IL (US)

(72) Inventor: Sho Sato, Mercer Island, WA (US)

(73) Assignee: The Boeing Company, Arlington, VA (US)

( * ) Notice: Subject to any disclaimer, the term of this patent is extended or adjusted under 35 U.S.C. 154(b) by 301 days.

(21) Appl. No.: 17/538,849

(22) Filed: Nov. 30, 2021

(65) Prior Publication Data

US 2023/0166832 A1 Jun. 1, 2023

(51) Int. Cl.
*B64C 21/01* (2023.01)

(52) U.S. Cl.
CPC .................................. *B64C 21/01* (2023.01)

(58) Field of Classification Search
CPC ......... B64C 21/00; B64C 21/01; B64C 21/02; B64C 21/06
See application file for complete search history.

(56) References Cited

U.S. PATENT DOCUMENTS

| | | | |
|---|---|---|---|
| 3,109,614 A | 11/1963 | Steidl | |
| 3,286,470 A | 11/1966 | Gerlaugh | |
| 3,576,300 A | 4/1971 | Palfreyman | |
| 5,236,155 A | 8/1993 | Hrach | |
| 5,529,263 A | 6/1996 | Rudolph | |
| 6,575,406 B2 | 6/2003 | Nelson | |
| 8,398,022 B2 | 3/2013 | Cazals et al. | |
| 9,376,213 B2 | 6/2016 | Rolt | |
| 9,909,530 B2 | 3/2018 | Tillman et al. | |
| 10,099,793 B2 | 10/2018 | Ullman et al. | |
| 10,549,845 B2 | 2/2020 | Epstein et al. | |
| 2007/0241229 A1 | 10/2007 | Silkey et al. | |
| 2008/0121756 A1 | 5/2008 | McComb | |
| 2014/0252161 A1 | 9/2014 | Gukeisen | |
| 2016/0332741 A1 | 11/2016 | Moxon | |
| 2017/0081035 A1 | 3/2017 | Becker et al. | |
| 2017/0081037 A1 | 3/2017 | Marrinan et al. | |
| 2017/0096232 A1 | 4/2017 | Suciu et al. | |
| 2018/0298829 A1 | 10/2018 | Lord et al. | |
| 2022/0350348 A1* | 11/2022 | Nunes | B64U 10/20 |
| 2022/0355916 A1* | 11/2022 | Gottapu | B64D 29/04 |

OTHER PUBLICATIONS

U.S. Appl. No. 17/241,913, filed Apr. 27, 2021.

* cited by examiner

*Primary Examiner* — Nicholas McFall
(74) *Attorney, Agent, or Firm* — Kunzler Bean & Adamson

(57) ABSTRACT

An aircraft is equipped with multiple fans for boundary layer ingestion. The aircraft comprises a fuselage, having an exterior surface and a rearward-most end. The aircraft also comprises a plurality of fans that are fixed to and positioned about the exterior surface of the fuselage at an axial location forward of the rearward-most end of the fuselage. Each one of the plurality of fans comprises a plurality of fan blades and a fan drive configured to rotate the plurality of fan blades. The plurality of fan blades are positioned at lateral locations relative to the exterior surface of the fuselage such that when rotated by the fan drive the plurality of fans receive and accelerate fuselage boundary layer air flow, along the exterior surface of the fuselage, from a first average velocity to a second average velocity, greater than the first average velocity, when the aircraft is in flight.

20 Claims, 9 Drawing Sheets

AIRCRAFT BOUNDARY LAYER INGESTION USING MULTIPLE FANS AND ASSOCIATED METHODS

FIELD

This disclosure relates generally to improving aerodynamic efficiency of aircraft in flight, and more particularly to ingestion of boundary layer flow along an aircraft in flight.

BACKGROUND

When an aircraft is in flight, air flows over the aircraft and creates a boundary layer of slower moving air near the exterior surface of the aircraft. The velocity of the boundary layer air flow is lower than the free stream velocity of the aircraft. Accordingly, the boundary layer air flow generates a drag force on the aircraft, which decreases aerodynamic efficiency of the aircraft and correspondingly increases the amount of fuel consumed by the aircraft during flight. The boundary layer at some portions of the aircraft, such as the rear portion of the aircraft, can be thicker, and thus can more negatively affect the aerodynamic efficiency of the aircraft, than at other portions of the aircraft.

Boundary layer ingestion solutions have been employed in an attempt at improving the overall efficiency of the aircraft and reducing fuel consumption. Generally, boundary layer ingestion includes ingesting at least a portion of the slower moving air of boundary layer air flow and expelling it at a greater average velocity. Some boundary layer ingestion solutions use a single and bulky (i.e., large and heavy) apparatus which, due to the bulkiness of the apparatus, offsets fuel consumption gains from the boundary layer ingestion. Furthermore, some boundary layer ingestion solutions cannot be retrofitted to existing aircraft and/or can interfere with operational parts of the aircraft, such as an auxiliary power unit (APU) located at a rear of the aircraft. Additionally, some boundary layer ingestion solutions assume an axisymmetric boundary layer and thus position a single apparatus circumferentially about the aircraft.

SUMMARY

The subject matter of the present application provides examples of an aircraft with multiple fans for boundary layer ingestion and associated methods that overcome the above-discussed shortcomings of prior art techniques. Accordingly, in some examples, the apparatuses and methods of the subject matter disclosed herein help provide a boundary layer ingestion solution that is lightweight, retrofittable, and/or capable of ingesting asymmetric boundary layer air flow. The subject matter of the present application has been developed in response to the present state of the art, and in particular, in response to shortcomings of conventional systems.

Disclosed herein is an aircraft. The aircraft comprises a fuselage, comprising an exterior surface and a rearward-most end. The aircraft also comprises a plurality of fans, fixed to and positioned about the exterior surface of the fuselage at an axial location forward of the rearward-most end of the fuselage. Each one of the plurality of fans comprises a plurality of fan blades and a fan drive, configured to rotate the plurality of fan blades. The plurality of fan blades positioned at lateral locations relative to the exterior surface of the fuselage such that when rotated by the fan drive the plurality of fans receive and accelerate fuselage boundary layer air flow, along the exterior surface of the fuselage. The boundary layer air flow is accelerated from a first average velocity to a second average velocity, greater than the first average velocity, when the aircraft is in flight. The preceding subject matter of this paragraph characterizes example 1 of the present disclosure.

The aircraft further comprises a rearward-most control surface, fixed to and extending from the exterior surface of the fuselage. The axial location of the plurality of fans is between the rearward-most control surface and the rearward-most end of the fuselage. The preceding subject matter of this paragraph characterizes example 2 of the present disclosure, wherein example 2 also includes the subject matter according to example 1, above.

A diameter of each one of the plurality of fan blades is less than a maximum diameter of a cross-section of the fuselage at the axial location of the plurality of fans. The preceding subject matter of this paragraph characterizes example 3 of the present disclosure, wherein example 3 also includes the subject matter according to any of examples 1-2, above.

The diameter of each one of the plurality of fan blades is less than fifty percent of the maximum diameter of the cross-section of the fuselage at the axial location. The preceding subject matter of this paragraph characterizes example 4 of the present disclosure, wherein example 4 also includes the subject matter according to example 3, above.

Diameters of the plurality of fan blades are equal. The preceding subject matter of this paragraph characterizes example 5 of the present disclosure, wherein example 5 also includes the subject matter according to of any examples 1-4, above.

A diameter of at least one of the plurality of fan blades of the plurality of fans is different than the diameter than the diameter of another one of the plurality of fan blades of the plurality of fans. The preceding subject matter of this paragraph characterizes example 6 of the present disclosure, wherein example 6 also includes the subject matter according to any of examples 1-5, above.

The plurality of fans comprises an even number of fans arranged symmetrically about the fuselage. The preceding subject matter of this paragraph characterizes example 7 of the present disclosure, wherein example 7 also includes the subject matter according to any of examples 1-6, above.

Alternatively, the plurality of fans comprises an odd number of fans arranged symmetrically about the fuselage. The preceding subject matter of this paragraph characterizes example 8 of the present disclosure, wherein example 8 also includes the subject matter according to any of examples 1-7, above.

The plurality of fans comprises between three and eight fans. The preceding subject matter of this paragraph characterizes example 9 of the present disclosure, wherein example 9 also includes the subject matter according to any of examples 1-8, above.

The plurality of fans are grouped into a plurality of fan pods. Each one of the plurality of fan pods comprises at least two fans. The at least two fans of each one of the plurality of fan pods are spaced closer to each other than the fans of adjacent ones of the plurality of fan pods. The preceding subject matter of this paragraph characterizes example 10 of the present disclosure, wherein example 10 also includes the subject matter according to any of examples 1-9, above.

The aircraft further comprises a fan housing. The fan housing circumferentially surrounds each one of the plurality of fan pods. The fan housing extends forward of the plurality of fan blades of each of the plurality of fans, such that the plurality of fans of each one of the plurality of fan pods share a fan inlet for the boundary layer air flow when the aircraft is in flight. The preceding subject matter of this paragraph characterizes example 11 of the present disclosure, wherein example 11 also includes the subject matter according to example 10, above.

At the axial location, the fuselage boundary layer air flow extends further away from the exterior surface of the fuselage than at any other location along the fuselage. The preceding subject matter of this paragraph characterizes example 12 of the present disclosure, wherein example 12 also includes the subject matter according to any of examples 1-11, above.

The second average velocity is less than a free stream velocity at the axial location when the aircraft is in flight. The preceding subject matter of this paragraph characterizes example 13 of the present disclosure, wherein example 13 also includes the subject matter according to any of examples 1-12, above.

The second average velocity is lower than a minimum thrust-producing velocity of the aircraft. The preceding subject matter of this paragraph characterizes example 14 of the present disclosure, wherein example 14 also includes the subject matter according to any of examples 1-13, above.

The fuselage extends longitudinally along a central axis of the fuselage. Each one of the plurality of fan blades rotates about a rotational axis. The rotational axis of each one of the plurality of fan blades is parallel to the central axis. The preceding subject matter of this paragraph characterizes example 15 of the present disclosure, wherein example 15 also includes the subject matter according to any of examples 1-14, above.

The fuselage extends longitudinally along a central axis of the fuselage. The exterior surface is angled, relative to the central axis, at the axial location. Each one of the plurality of fan blades rotates about a rotational axis. The rotational axis of each one of the plurality of fan blades is parallel to the exterior surface at the axial location. The preceding subject matter of this paragraph characterizes example 16 of the present disclosure, wherein example 16 also includes the subject matter according to any of examples 1-15, above.

The fuselage extends longitudinally along a central axis of the fuselage. Each one of the plurality of fan blades rotates about a rotational axis. The rotational axis of at least one of the plurality of fan blades is angled at a first angle, relative to the central axis. The rotational axis of at least another one of the plurality of fan blades is angled at a second angle, relative to the central axis. The first angle is greater than the second angle. The preceding subject matter of this paragraph characterizes example 17 of the present disclosure, wherein example 17 also includes the subject matter according to any of examples 1-16, above.

Further disclosed herein is an aircraft. The aircraft comprises a fuselage, comprising an exterior surface and a rearward-most end. The aircraft also comprises a plurality of fans that are fixed to and positioned about the exterior surface of the fuselage at an axial location forward of the rearward-most end of the fuselage. The plurality of fans are grouped into a plurality of fan pods comprising at least two fans. The at least two fans of each one of the plurality of fan pods are spaced closer to each other than the fans of adjacent ones of the plurality of fan pods. Each one of the plurality of fans comprises a plurality of fan blades and a fan drive configured to rotate the plurality of fan blades. The plurality of fan blades are positioned at lateral locations relative to the exterior surface of the fuselage such that when rotated by the fan drive the plurality of fans receive and accelerate fuselage boundary layer air flow, along the exterior surface of the fuselage. The boundary layer air flow is accelerated from a first average velocity to a second average velocity greater than the first average velocity, when the aircraft is in flight. The preceding subject matter of this paragraph characterizes example 18 of the present disclosure.

Additionally, disclosed herein is a method of boundary layer ingestion during flight of an aircraft. The method comprises the step of rotating a plurality of fan blades of each one of a plurality of fans when the aircraft is in flight. The plurality of fans fixed to and positioned about an exterior surface of a fuselage at an axial location forward of a rearward-most end of the fuselage. The method also comprises the step of drawing a boundary layer air flow, at a first average velocity, into the plurality of fan blades of each one of the plurality of fans, when the plurality of fan blades are rotating. The method further comprises the step of expelling the boundary layer air flow from the plurality of fan blades of each one of the plurality of fans at a second average velocity, greater than the first average velocity. The preceding subject matter of this paragraph characterizes example 19 of the present disclosure.

The step of rotating a plurality of fan blades of each one of the plurality of fans further comprises rotating a plurality of fan blades of each one of the plurality of fans grouped in a plurality of fan pods. Each one of the plurality of fan pods comprises at least two fans and the at least two fans of each one of the plurality of fan pods are spaced closer to each other than the fans of adjacent ones of the plurality of fan pods. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
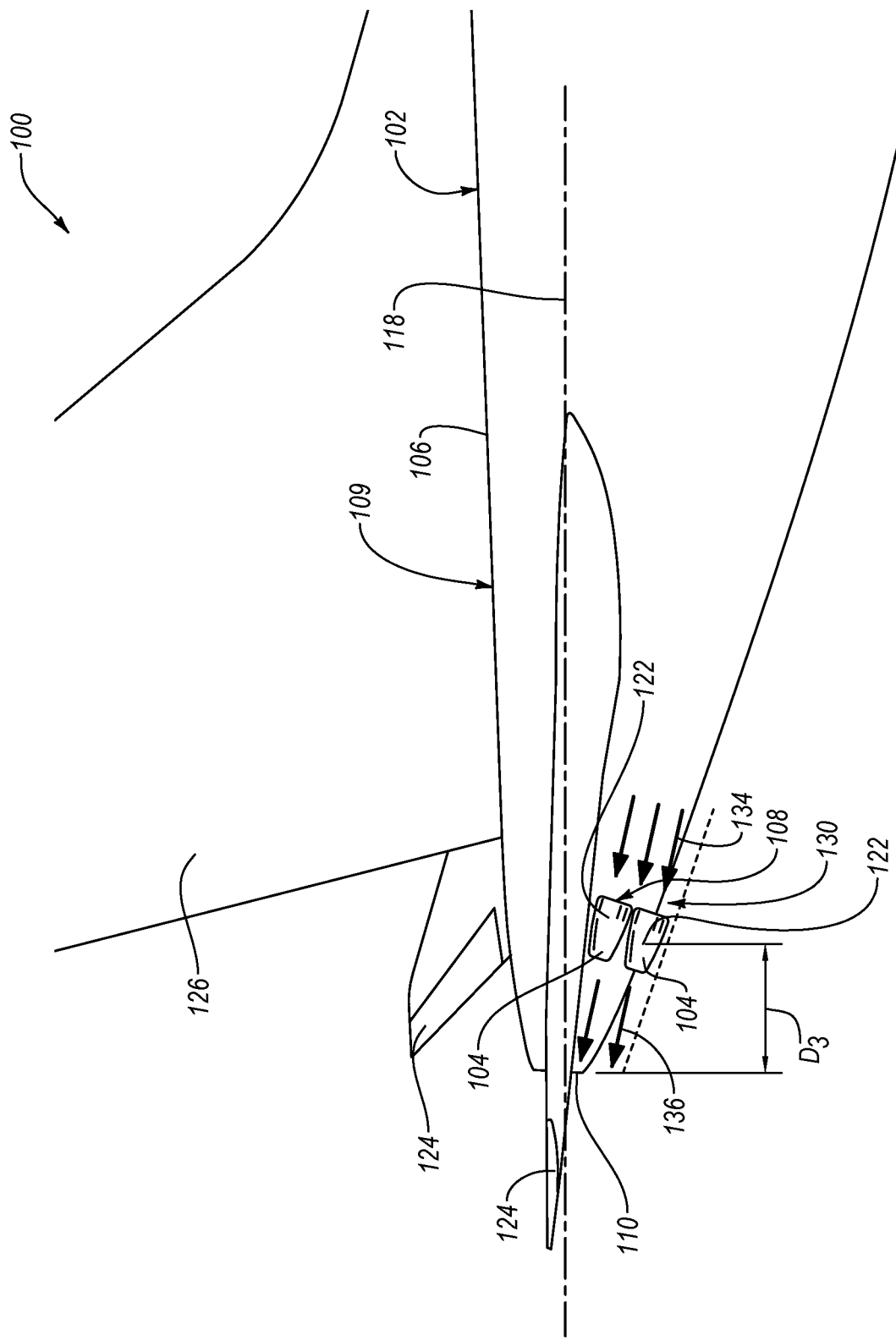
FIG. 1 is a schematic perspective view of an aircraft with multiple fans for boundary layer ingestion, according to one or more examples of the present disclosure.

Referring to FIG. 1, one example of a rear portion 109 of an aircraft 100 is shown. The aircraft 100 includes a fuselage 102 that has an exterior surface 106 and a rearward-most end 110. Additionally, the aircraft 100 includes horizontal stabilizers 124 and a vertical stabilizer 126 coupled to and projecting outward from the fuselage 102. A plurality of fans 104 are fixed to and positioned about at least a portion of a circumference of the exterior surface 106 of the fuselage 102.

When the aircraft 100 is in flight, air traveling over the aircraft 100 creates a boundary layer air flow 130 of slower moving air along portions of the exterior surface 106 of the fuselage 102, including, in some examples, along a rear portion 109 of the fuselage 102. The average velocity of the boundary layer air flow 130 is below a free stream velocity of the aircraft 100. Moreover, the deficit of the average velocity of the boundary layer air flow 130, relative to the free stream velocity, generates a drag force on the fuselage 102. The drag force increases the amount of fuel consumed by the aircraft 100. Accordingly, a reduction in the drag force related to the boundary layer air flow 130 can improve the aerodynamic efficiency (i.e., fuel efficiency) of the aircraft 100.

Boundary layer ingestion provides a way to overcome the negative effects of boundary layer air flow 130 on aerodynamic efficiency and improve the overall efficiency of the aircraft 100. More specifically, boundary layer ingestion reduces the drag force on the aircraft 100 by ingesting at least a portion of the boundary layer air flow 130 and accelerating the ingested portion of the boundary layer air flow 130 to a greater average velocity. Conventional boundary layer ingestion solutions use a single apparatus, such as a thrust-producing engine which is positioned proximate a tail or rearward-most end of the aircraft (e.g., circumferentially about the tail of the aircraft). However, such apparatuses can be bulky (i.e., large and heavy) and may not be retrofittable to existing aircraft designs. The bulk of the single apparatus can offset the drag reduction associated with the boundary layer ingestion due to the added weight to the aircraft. Furthermore, a single apparatus can only ingest the boundary layer air flow 130 at the location associated with the location of apparatus. Moreover, a single apparatus positioned circumferentially about the tail of the aircraft is effective only if the boundary layer air flow 130 axis-symmetrically forms around the tail of the aircraft. As used herein axis-symmetric means symmetrical about an axis. However, boundary layer air flow does not necessarily develop axis-symmetrically around the rear portion of the aircraft. Boundary layer air flow 130 may develop asymmetrically about the exterior surface 106 of the fuselage 102, such that a single apparatus cannot effectively capture an asymmetric boundary layer air flow 130. Therefore, in the present disclosure, the plurality of fans 104 are positioned on the fuselage 102 to more effectively capture asymmetric boundary layer air flow 130.

A boundary layer ingestion system 108, which includes the plurality of fans 104, is fixed to and positioned about at least a portion of a circumference of the exterior surface 106 of the fuselage 102, each fan 104 of the plurality of fans 104 at an axial location 122 forward of the rearward-most end 110 of the fuselage 102. In one example, the axial location 122 of each one of the plurality of fans 104 is located in the rear portion 109 of the fuselage 102. In other examples, the axial location 122 of each one of the plurality of fans 104 is located at a location that is rearward of the location where the horizontal stabilizers 124 and/or the vertical stabilizer 126 are attached to the fuselage 102, such that the plurality of fans 104 do not interfere with any control surfaces of the fuselage 102. In yet another example, the axial location 122 of each one of the plurality of fans 104 is located at a location along the fuselage 102 where the boundary layer air flow 130 extends further away from the exterior surface 106 of the fuselage 102 than at any other location along the fuselage 102. In other words, the boundary layer air flow 130 has a thickness T (see, e.g., FIG. 2), and the axial location 122 of each fan 104 is located along the fuselage 102 where the boundary layer air flow 130 is thicker than any other location along the fuselage 102. For example, the boundary layer air flow 130 may be thickest along the rear portion 109 of the fuselage 102, such as rearward of the location where the horizontal stabilizers 124 and/or the vertical stabilizer 126 are coupled to the fuselage 102.

In some examples, the axial location 122 of each one of the plurality of fans 104 is a distance D3 from the rearward-most end 110 in a direction parallel to a central axis 118 of the fuselage 102. The central axis 118 of the fuselage 102 extends longitudinally along the fuselage 102, from a forward-most end (not shown) to the rearward-most end 110 of the fuselage 102. In other examples, the axial location 122 of at least one of the plurality of fans 104 is at a different axial location 122 from the other fans 104 of the plurality of fans 104. In other words, at least one fan 104 is offset from others of the plurality of fans 104. In yet other examples, each fan 104 of the plurality of fans 104 is at a different axial location 122 from other fans 104 of the plurality of fans 104.

The plurality of fans 104 are fixed to and extend laterally away from the exterior surface 106 of the fuselage 102. In one example, the plurality of fans 104 are integral to the fuselage 102, such that the plurality of fans 104 (e.g., the housing or fan ducts surrounding the fan blades of each of the plurality of fans) are permanently integrated with the fuselage 102. In another example, the plurality of fans 104 are fixed to the fuselage 102, such as with any of various fixation techniques (e.g., fastening or bonding) after the fuselage 102 is manufactured. In some examples, the plurality of fans 104 are non-adjustably fixed to the fuselage 102, such that the axial or circumferential location, or orientation, of the plurality of fans 104 on the fuselage 102 is not changeable. In other examples, the plurality of fans 104 are adjustably fixed to the fuselage 102, such that, one or more of the location or orientation the plurality of fans 104 is changeable or capable of adjustment without permanently changing or damaging the exterior surface 106.

The plurality of fans 104 includes at least two fans 104 fixed to and positioned about the exterior surface 106 of the fuselage 102. In some examples, the plurality of fans 104 includes up to eight fans 104. In other examples, the plurality of fans includes between three and eight fans 104. The plurality of fans 104 draw in at least a forward portion 134 of the boundary layer air flow 130 (e.g., a portion of the boundary layer air flow forward of the axial location 122). The forward portion 134 of the boundary layer air flow 130 has a first average velocity before passing through the plurality of fans 104. The boundary layer air flow 130 is accelerated through the plurality of fans 104 and expelled as a rearward portion 136 of the boundary layer air flow 130, which has a second average velocity. The second average velocity is greater than the first average velocity. In some examples, the second average velocity is less than a free stream velocity at the axial location 122 but less than or equal to (i.e., not greater than) the free stream velocity of the fuselage 102. Thus, the plurality of fans 104, in some examples, operate in manner that does not generate thrust for the aircraft 100. In other words, the plurality of fans 104 are not a thrust-producing engine for the aircraft 100. In other examples, the second average velocity exceeds the free stream velocity at the axial location 122, such that the plurality of fans 104 can operated in a manner that generates a small degree of thrust for the aircraft 100 (e.g., minimal thrust relative to the trust produced by a main engine of the aircraft 100).

Figure 2:
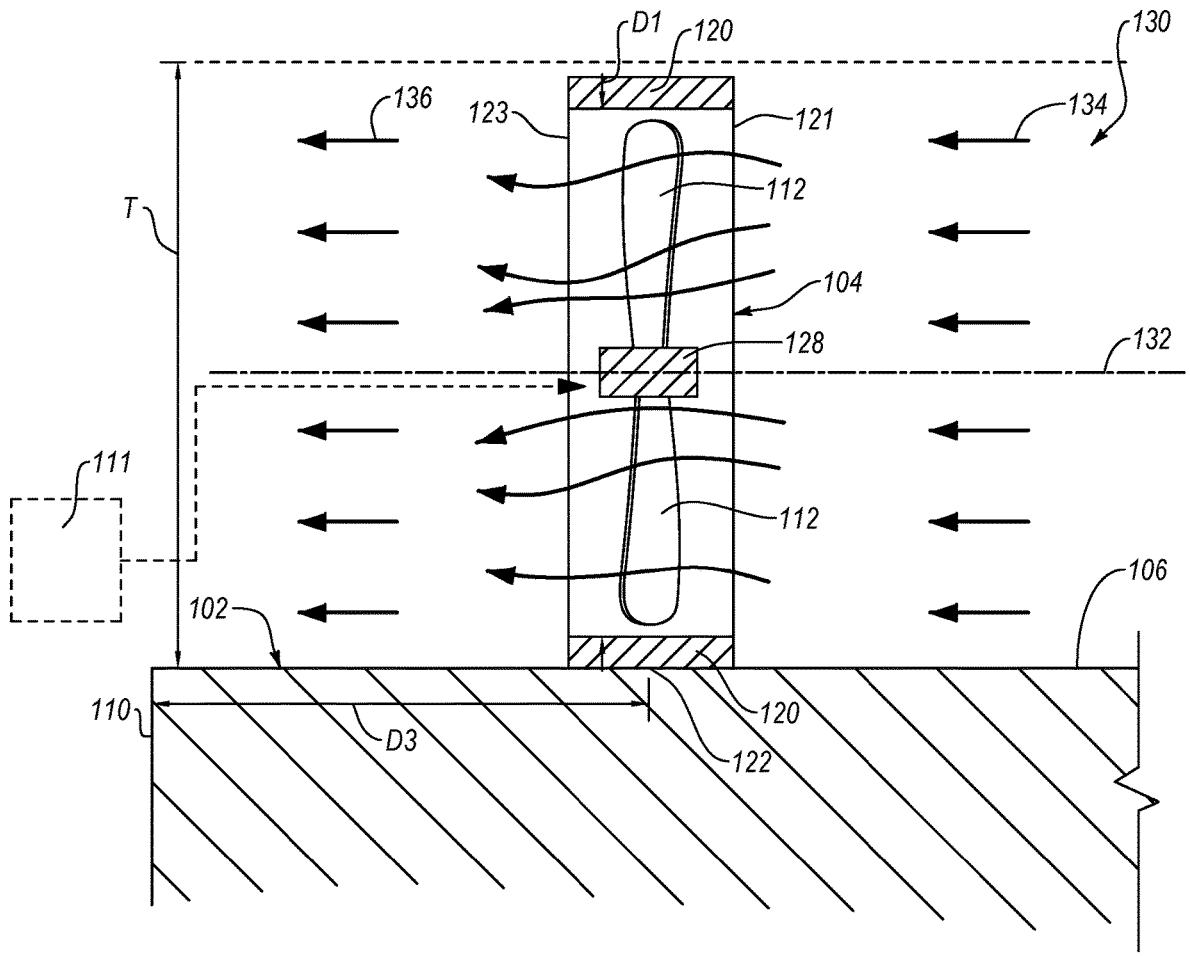
FIG. 2 is a schematic cross-sectional elevation view of a fuselage with a fan for boundary layer ingestion, according to one or more examples of the present disclosure.

Referring to FIG. 2, boundary layer air flow 130, having a thickness T, flows into, through, and out from a fan 104 that is fixed to and extends laterally away from the exterior surface 106 of the fuselage 102. Although only one fan 104 is shown, additional fans 104 would also be fixed to the exterior surface 106 of the fuselage 102 and receive the boundary layer air flow 130 in a similar manner. The fan 104 is fixed to the exterior surface 106 at the axial location 122. The axial location 122 is forward of the rearward-most end 110 of the fuselage 102 by a distance D3. The axial location 122 corresponds with a central plane of rotation of the fan 104 (e.g., the central plane of rotation of the fan blades of the fan).

The fan 104 has a plurality of fan blades 112. Because the fan 104 is at a lateral location, relative to the exterior surface 106 of the fuselage 102, the plurality of fan blades 112 are also positioned at a lateral location, relative to the exterior surface 106 of the fuselage 102. The fan blades 112 are of a size and shape that is capable of drawing in the forward portion 134 of the boundary layer air flow 130 at the first average velocity and expelling the rearward portion 136 of boundary layer air flow 130 at the second average velocity.

The plurality of fan blades 112 have a diameter D1, which is defined by the maximum radial extent of the fan blades 112. In some examples, each of the plurality of fan blades 112 of the plurality of fans 104 have the same diameter D1. In other examples, at least one of the plurality of fan blades 112 of the plurality of fans 104 has a diameter that is different than the diameter D1 of another one of the plurality of fan blades 112 of the plurality of fans 104. In other words, in certain examples, the size of at least one of the plurality of fans 104 can be different than the size of at least another one of the plurality of fans 104. In one example, the diameter D1 of the plurality of fan blades 112 of each fan of the plurality of fans 104 is less than a maximum diameter D2 of a cross-section of the fuselage 102 at the axial location 122 of the fan 104 (see, e.g., FIG. 3A). In other examples, the diameter D1 of the plurality of fan blades 112 of each fan of the plurality of fans 104 is less than fifty percent of the maximum diameter D2 of the cross-section of the fuselage 102 at the axial location 122 of the fan 104.

Each fan 104 includes a fan drive 128 (e.g., motor) that is coupled with the fan blades 112 (e.g., via direct or indirect mechanical connection to the fan blades 112) and configured to rotate the plurality of fan blades 112 in response to a supply of energy provided to the fan drive 128. In one example, the fan drive 128 is located at the center of the plurality of fan blades 112, such that the fan drive 128 is at a hub of the fan 104. In other examples, the fan drive 128 is located at a different location other than the hub of the fan 104. For example, the fan drive 128 can be integrated with a fan housing 120 or located apart from the fan 104. The plurality of fan blades 112 rotate around a rotational axis 132. Accordingly, the plurality of fan blades 112 project radially outward from the rotational axis 132. Each fan 104 includes a fan inlet 121, defined by the opening in a fan housing 120 of the fan 104 where the forward portion 134 of the boundary layer air flow 130 enters the fan 104. The fan inlet 121 is perpendicular to the rotational axis 132.

The aircraft 100 further includes a power system 111 that powers each fan drive 128 of the plurality of fans 104. The power system 111 can be any system capable of powering each fan drive 128 of the plurality of fans 104, including but not limited to, the aircraft APU, the aircraft main engine(s), batteries, discrete electric motor, etc. The power system 111 can power each fan drive 128 via direct or indirect connection to the fan drive 128.

The fan housing 120 circumferentially encloses the plurality of fan blades 112 of the fan 104. The fan housing 120 is integrated with or attached (e.g., directly or indirectly) to the exterior surface 106 of the fuselage 102. Accordingly, the fan 104 is fixed to the exterior surface 106 of the fuselage 102 via a portion of the fan housing 120. The fan housing 120 defines the fan inlet 121 through which the boundary layer air flow 130 is drawn into the fan blades 112, and a fan outlet 123, through which the boundary layer air flow 130 is expelled by the fan blades 112. In other words, the forward portion 134 of the boundary layer air flow 130 is drawn into the fan inlet 121 and the rearward portion 136 of the boundary layer air flow 130 is expelled from the fan outlet 123. Additionally, the fan housing 120 helps protect the plurality of fan blades 112 from accidental damage due to exterior forces and impacts.

Figure 3A:
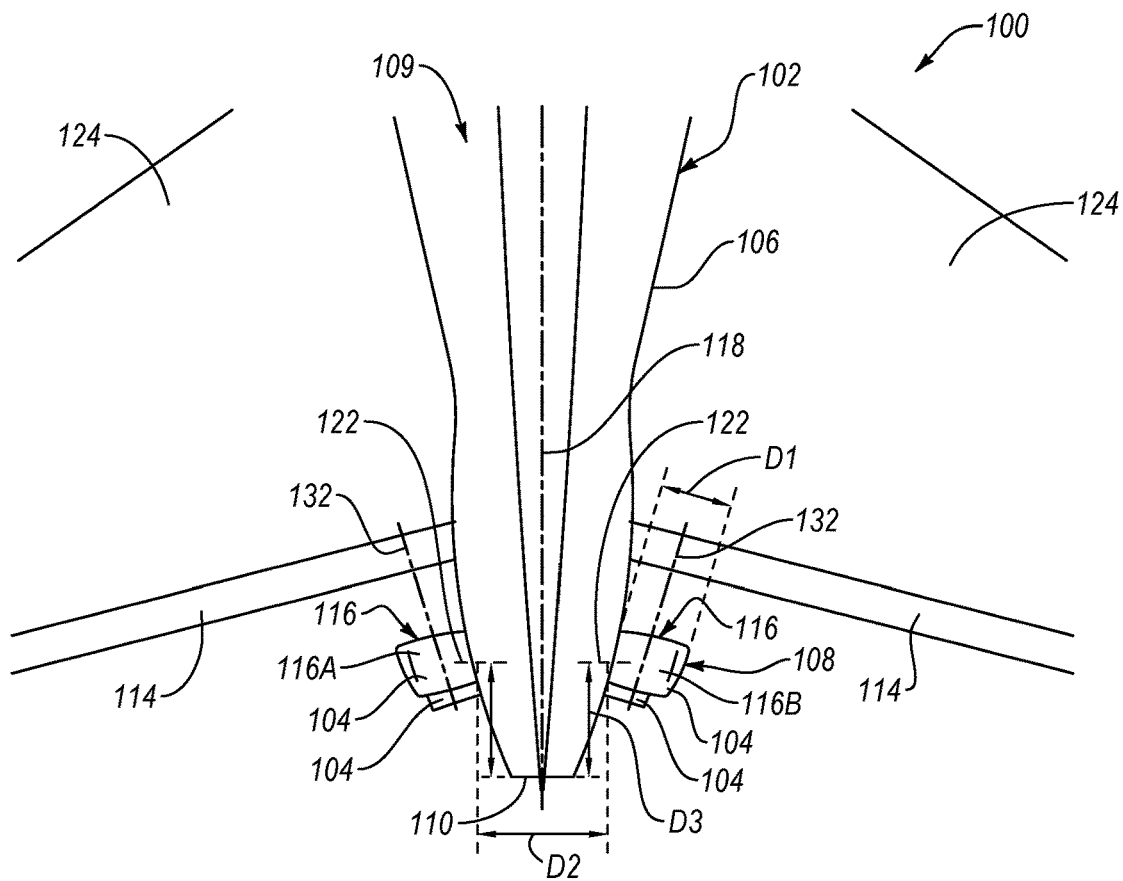
FIG. 3A is a schematic top view of an aircraft with multiple fans for boundary layer ingestion, according to one or more examples of the present disclosure.
Figure 3B:
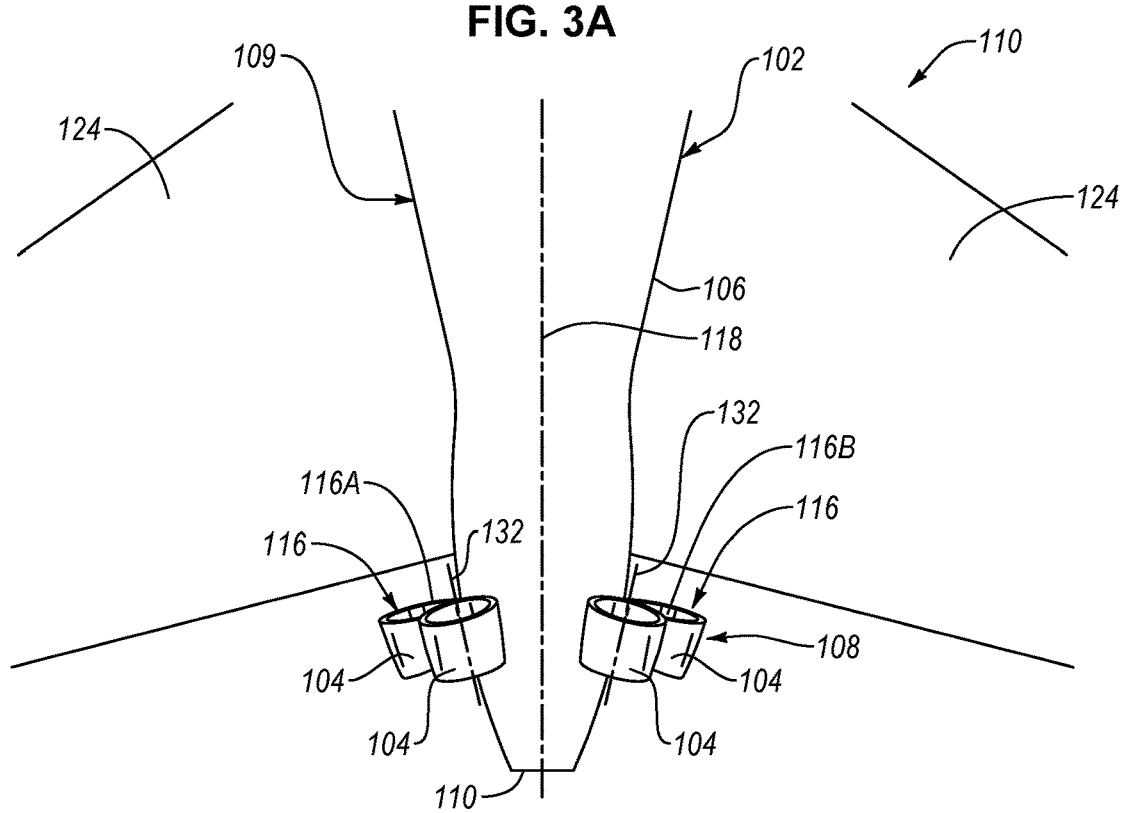
FIG. 3B is a schematic bottom view of the aircraft of FIG. 3A, according to one or more examples of the present disclosure.

Referring to FIG. 3A and FIG. 3B, a top view and a bottom view, respectively, of one configuration of a boundary layer ingestion system 108 of an aircraft 100 is shown. The aircraft 100 has a plurality of fans 104 that are grouped into a plurality of fan pods 116. Each one of the plurality of fan pods 116 includes at least two fans 104 that are fixed to and positioned circumferentially about the exterior surface 106 of the fuselage 102 at the axial location 122. Although the fan pods 116 are each shown with two fans 104, in other examples, each fan pod 116 can have more than two fans 104 (e.g., three or four fans 104). As shown, the boundary layer ingestion system 108 includes a first fan pod 116A and a second fan pod 116B. The first fan pod 116A includes two fans 104 and the second fan pod 116B includes two fans 104. The first fan pod 116A is spaced apart from the second fan pod 116B. In one example, the distance between the first fan pod 116A and the second fan pod 116B is greater than the distance between the two fans of each fan pod 116A and 116B, respectively. Accordingly, in some examples, the fans 104 in each fan pod 116 are spaced closer to each other than to the fans 104 of adjacent fan pods 116.

The fan pods 116 are fixed to the exterior surface 106 of the fuselage 102 at the axial location 122 that is between the rearward-most control surface 114 and the rearward-most end 110 of the fuselage 102. Each fan 104 of the fan pods 116 has a diameter D1 of the plurality of fan blades 112 that is less than the maximum diameter D2 of the cross-section of the fuselage 102 at the axial location 122 of the fan 104.

In some examples, as shown in FIGS. 3A and 3B, the rotational axis 132 of each one of the plurality of fans 104 is at an angle to the central axis 118 of the fuselage 102. For example, if the exterior surface 106 is angled, relative to the central axis 118, at the axial location 122 of each one of the plurality of fans 104, the rotational axis 132 may be parallel to the exterior surface 106 at the axial location 122. In other words, in some examples, the plurality of fans 104 are parallel to the exterior surface 106 of the fuselage 102, at the axial location 122 (e.g., the location the plurality of fans 104 are fixed to the exterior surface 106 of the fuselage 102).

Figure 4:
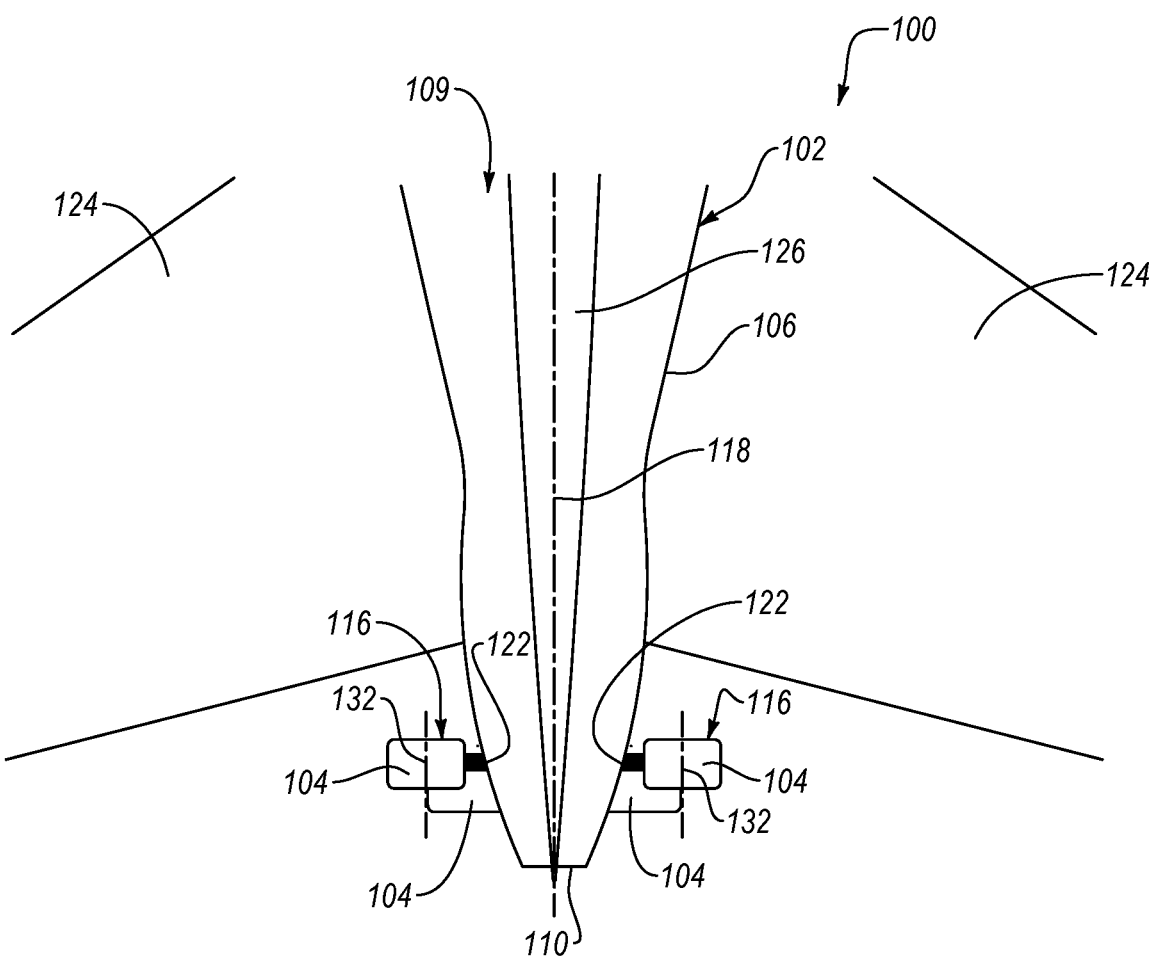
FIG. 4 is a schematic top view of an aircraft with multiple fans for boundary layer ingestion, according to one or more examples of the present disclosure.

In other examples, as shown in FIG. 4, the rotational axis 132 of each of the plurality of fans 104 is parallel to the central axis 118 of the fuselage 102. In other words, the plurality of fans 104 are not necessarily parallel to the exterior surface 106 of the fuselage 102 at the axial location 122. Accordingly, the rotational axis 132 of the plurality of fans 104 is parallel to the central axis 118 of the fuselage 102, regardless of the angle of the exterior surface 106 at the axial location 122.

Figure 5:
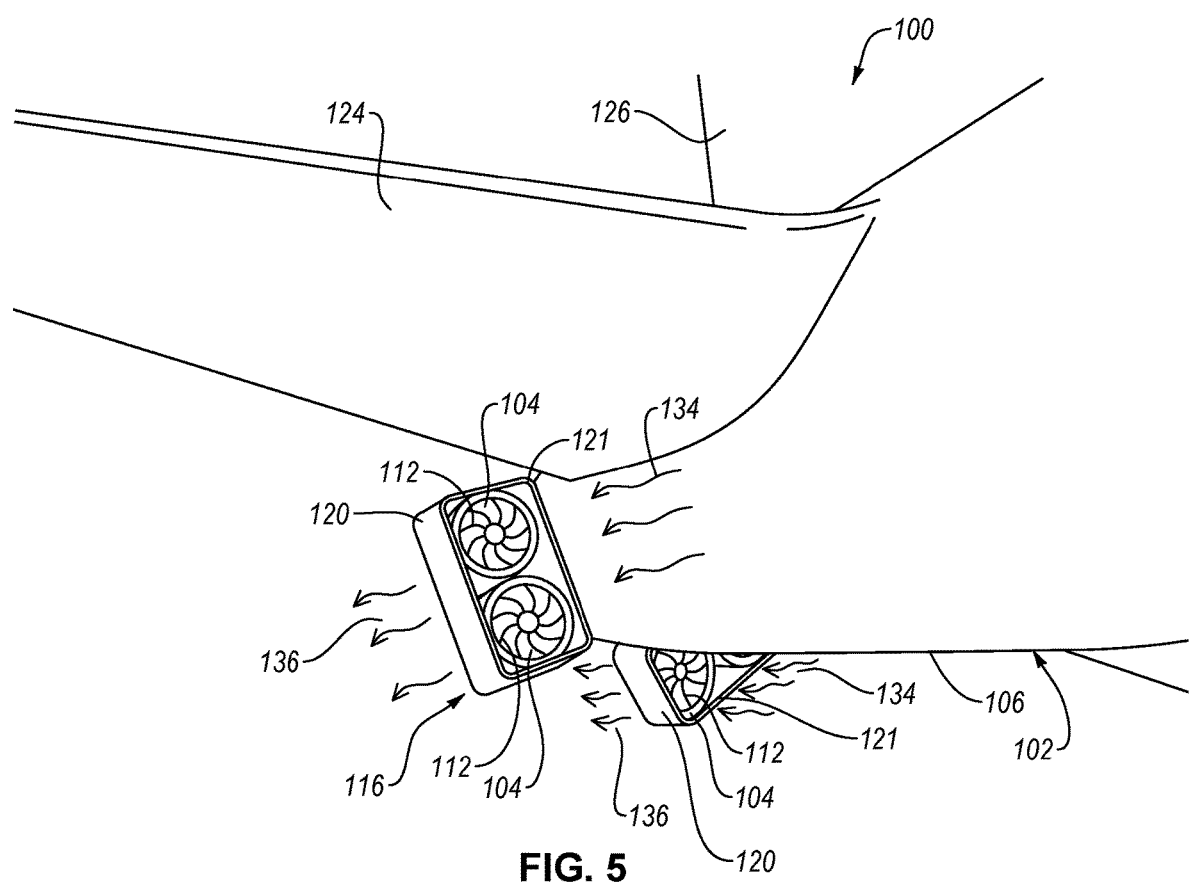
FIG. 5 is a schematic perspective view of an aircraft with multiple fans for boundary layer ingestion within a fan housing, according to one or more examples of the present disclosure.

As shown in FIG. 5, the fan housing 120 is sized to provide a fan inlet 121 for at least two fans 104. For example, a fan pod 116 may by circumferentially surrounding by a single fan housing 120, such that each fan 104 of the fan pod 116 is positioned within the fan housing 120. The fan inlet 121 extends forward of the plurality of fan blades 112 of each one of the plurality of fans 104 such that the forward portion 134 of the boundary layer air flow 130 enters the fan inlet 121 before it is ingested by the plurality of fans 104 within the fan housing 120. The rearward portion 136 of the boundary layer air flow 130 is expelled from the plurality of fans 104 through the shared fan outlet 123.

Figure 6:
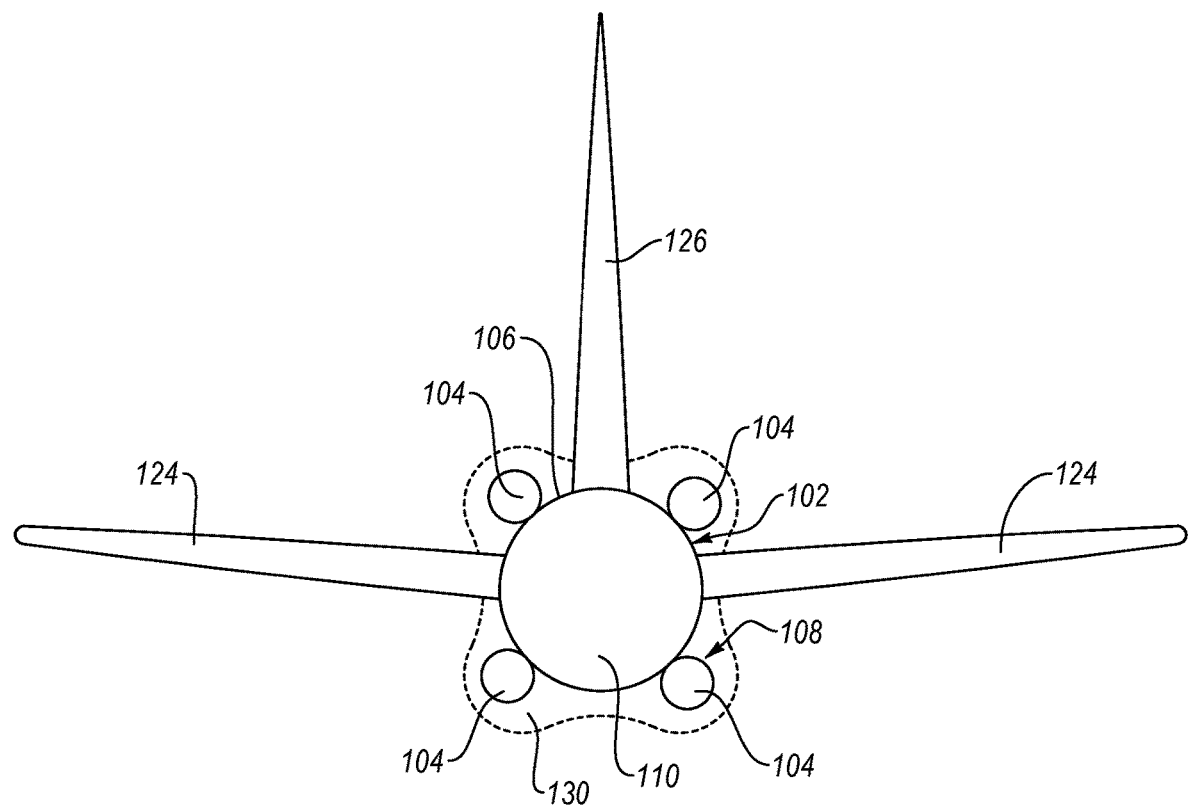
FIG. 6 is a schematic back view of an aircraft with multiple fans for boundary layer ingestions, according to one or more examples of the present disclosure.
Figure 7:
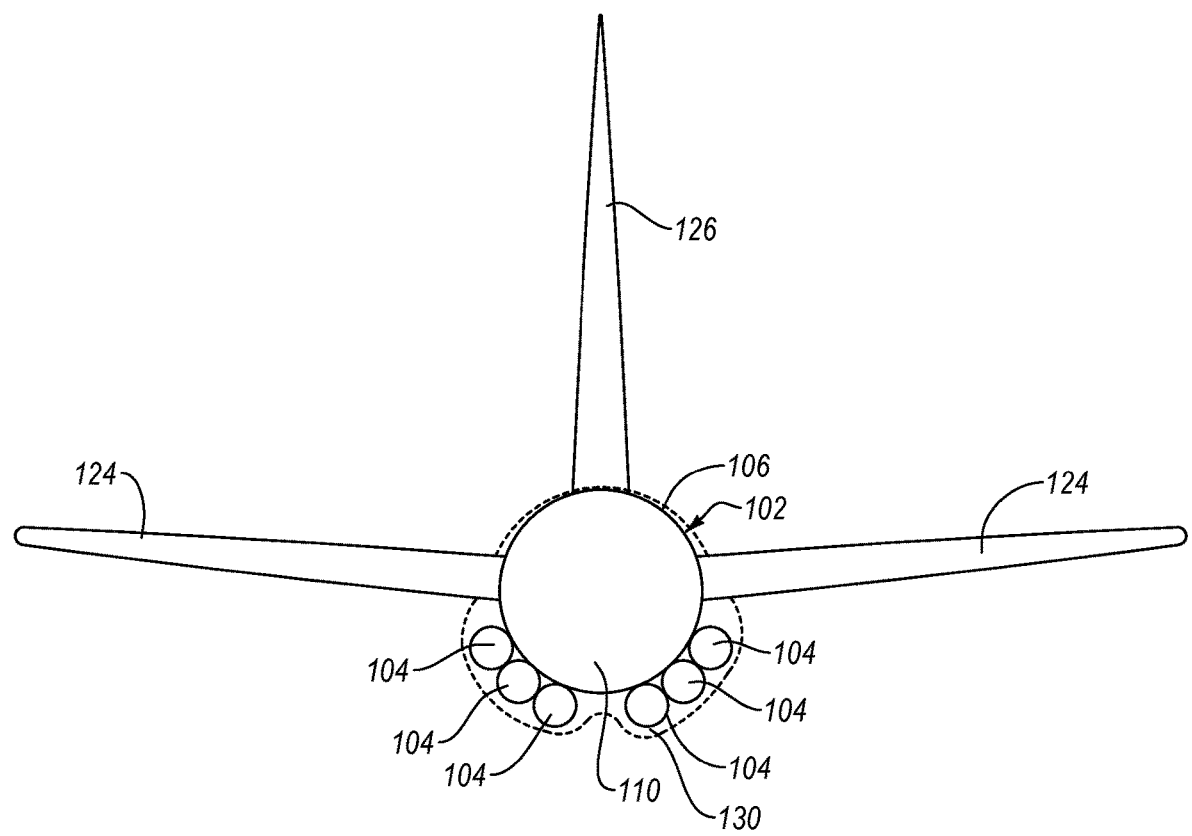
FIG. 7 is a schematic back view of an aircraft with multiple fans for boundary layer ingestions, according to one or more examples of the present disclosure.
Figure 8:
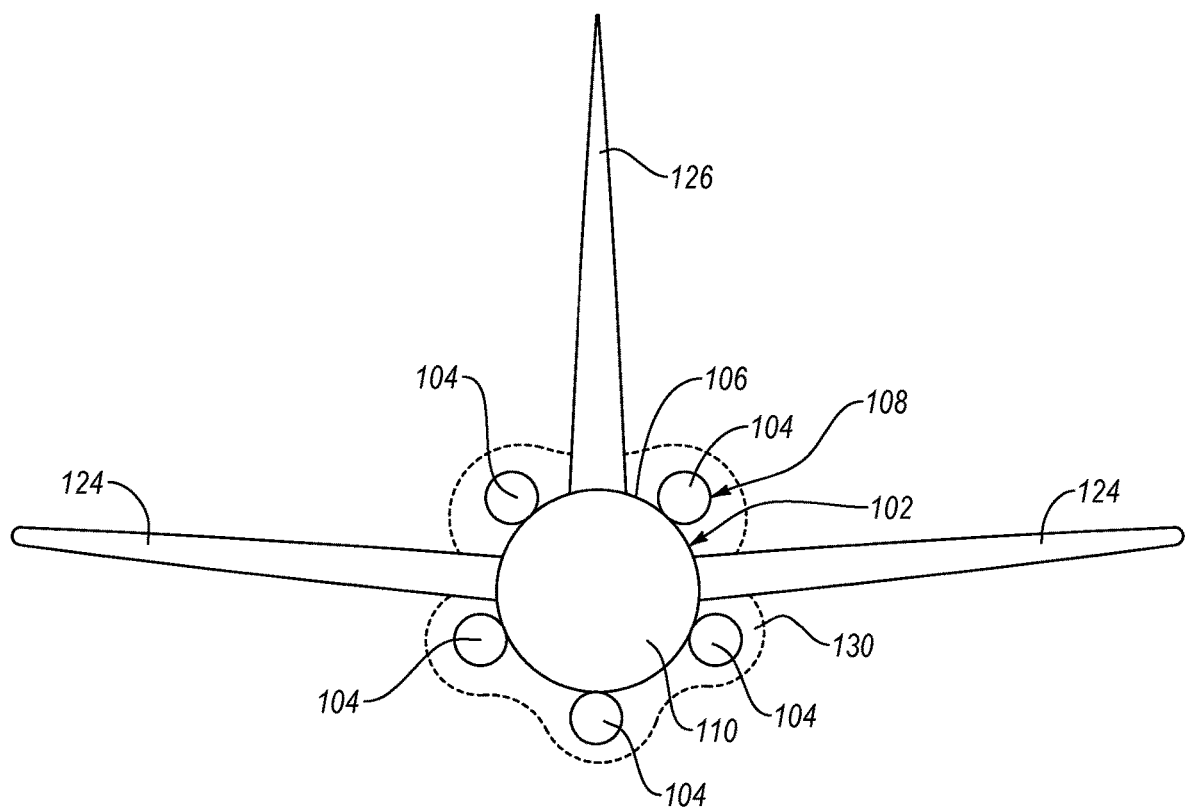
FIG. 8 is a schematic back view of an aircraft with multiple fans for boundary layer ingestions, according to one or more examples of the present disclosure.

Referring now to FIGS. 6, 7 and 8, according to some examples, different configurations of the boundary layer ingestion system 108, are shown. The boundary layer ingestion systems 108 each include a plurality of fans 104 fixed to and positioned about at least a portion of the circumferences of the exterior surface 106 of the fuselage 102, each fan 104 of the plurality of fans 104 are at an axial location 122 forward of the rearward-most end 110 of the fuselage 102. The boundary layer air flow 130 may development axis-symmetrically or asymmetrically about the exterior surface 106 of the fuselage 102, during flight of the aircraft 100, depending on many factors, including but not limited to the size and shape of the aircraft 100 and speed at which the aircraft 100 is traveling. The boundary layer ingestion system 108 can be configured to more effectively capture the boundary layer air flow 130.

As shown in FIGS. 6 and 7, in some examples, the plurality of fans 104 includes an even number of fans. The even number of fans 104 may be arranged symmetrically about the exterior surface 106 of the fuselage 102, such as symmetrically relative to a hypothetical plan on symmetry on which lies the central axis 118 of the fuselage 102. One example is shown in FIG. 6, where the plurality of fans 104 are symmetrically arranged relative to the hypothetical plane of symmetry that is parallel to the vertical stabilizer 126 (e.g., vertical plane). The plurality of fans 104 are spaced equidistant from each other about the exterior surface 106 of the fuselage 102. Another example is shown in FIG. 7, where the plurality of fans 104 are also symmetrically arranged relative to the hypothetical plane of symmetry that is parallel to the vertical stabilizer 126. The fans 104 are clustered into two fan pods 116, each fan pod 116 includes three fans 104. Other configurations that include fan pods 116 are possible and could be symmetrical or non-symmetrical depending on the configuration. In other examples, the plurality of fans 104 can be symmetrically arranged relative to the hypothetical plane of symmetry that is perpendicular to the vertical stabilizer 126 (e.g., horizontal plane). Alternatively, in some examples, the even number of fans may be arranged non-symmetrically about the fuselage 102.

In some examples, the plurality of fans 104 includes an odd number of fans. The odd number of fans 104 may be arranged symmetrically about the exterior surface 106 of the fuselage 102. One example is shown in FIG. 8, where the plurality of fans 104 includes five fans that are symmetrically arranged relative to a hypothetical plane of symmetry that is parallel to the vertical stabilizer 126 (e.g., vertical plane). Alternatively, in some examples, the odd number of fans 104 may be arranged non-symmetrically about the exterior surface 106 of the fuselage 102.

Figure 9:
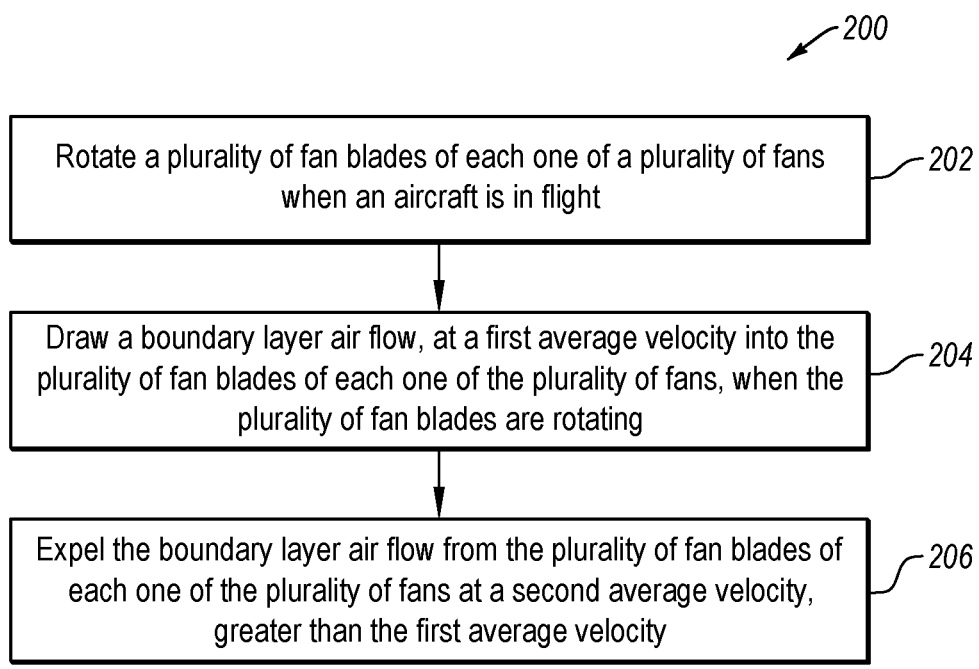
FIG. 9 is a schematic flow diagram of a method of boundary layer ingestion during flight of an aircraft, according to one or more examples of the present disclosure.

Now referring to FIG. 9, one example of a method 200 is shown. The method 200 includes (block 202) rotating a plurality of fan blades 112 of each one of a plurality of fans 104 when the aircraft 100 is in flight. The plurality of fans 104 fixed to and positioned about an exterior surface 106 of a fuselage 102 at an axial location 122 forward of a rearward-most end 110 of the fuselage. The method also includes (block 204) drawing a boundary layer air flow 130, at a first average velocity, into the plurality of fan blades 112 of each one of the plurality of fans 104, while the plurality of fan blades 112 are rotating. The method further includes (block 206) expelling the boundary layer air flow 130 from the plurality of fan blades 112 of each one of the plurality of fans 104 at a second average velocity, greater than the first average velocity.

In some examples, the step of rotating a plurality of fan blades 112 of each one of the plurality of fans 104 includes rotating a plurality of fan blades 112 of each one of the plurality of fans 104 grouped in a plurality of fan pods 116. Each one of the plurality of fan pods 116 includes at least two fans 104. In some examples, the two fans 104 in a fan pod 116 are spaced closer to each other than the fans 104 of adjacent one of the plurality of fan pods 116.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An aircraft, comprising:
a fuselage, comprising an exterior surface and a rearward-most end;
a plurality of control surfaces fixed to the exterior surface of the fuselage at first rearward-most axial locations and extending from the exterior surface of the fuselage at the first rearward-most axial locations; and
a plurality of fans, fixed directly to the exterior surface of the fuselage at second axial locations forward of the rearward-most end of the fuselage and rearward of the first rearward-most axial locations and positioned about the exterior surface of the fuselage at the second axial locations, each one of the plurality of fans comprising:
a plurality of fan blades; and
a fan drive, configured to rotate the plurality of fan blades, wherein the plurality of fan blades are positioned at lateral locations relative to the exterior surface of the fuselage such that when rotated by the fan drive the plurality of fans receive and accelerate boundary layer air flow, along the exterior surface of the fuselage, from a first average velocity to a second average velocity, greater than the first average velocity, when the aircraft is in flight.

2. The aircraft of claim 1, the plurality of control surfaces further comprising a rearward-most control surface of the aircraft.

3. The aircraft of claim 1, wherein a diameter of each one of the plurality of fan blades is less than a maximum diameter of a cross-section of the fuselage at the second axial locations.

4. The aircraft of claim 3, wherein the diameter of each one of the plurality of fans blades is less than fifty percent of the maximum diameter of the cross-section of the fuselage at the second axial locations.

5. The aircraft of claim 1, wherein diameters of the plurality of fans blades are equal.

6. The aircraft of claim 1, wherein a diameter of at least one of the plurality of fan blades of the plurality of fans is different than the diameter of another one of the plurality of fan blades of the plurality of fans.

7. The aircraft of claim 1, wherein the plurality of fans comprises an even number of fans arranged symmetrically about the fuselage.

8. The aircraft of claim 1, wherein the plurality of fans comprises an odd number of fans arranged symmetrically about the fuselage.

9. The aircraft of claim 1, wherein the plurality of fans comprises between three fans and eight fans.

10. The aircraft of claim 1, wherein:
the plurality of fans are grouped in a plurality of fan pods;
each one of the plurality of fan pods comprises at least two fans; and
the at least two fans of each one of the plurality of fan pods are spaced closer to each other than the fans of adjacent ones of the plurality of fan pods.

11. The aircraft of claim 10, further comprising a fan housing circumferentially surrounding each one of the plurality of fan pods, wherein the fan housing extends forward of the plurality of fan blades of each of the plurality of fans, such that the plurality of fans of each one of the plurality of fan pods share a fan inlet for the boundary layer air flow when the aircraft is in flight.

12. The aircraft of claim 1, wherein, at the second axial locations, the fuselage boundary layer air flow extends further away from the exterior surface of the fuselage than at any other location along the fuselage.

13. The aircraft of claim 1, wherein the second average velocity is less than a free stream velocity at the second axial locations when the aircraft is in flight.

14. The aircraft of claim 1, wherein the second average velocity is lower than a minimum thrust-producing velocity of the aircraft.

15. The aircraft of claim 1, wherein:
the fuselage extends longitudinally along a central axis of the fuselage;
each one of the plurality of fan blades rotates about a rotational axis; and
the rotational axis of each one of the plurality of fan blades is parallel to the central axis.

16. The aircraft of claim 1, wherein:
the fuselage extends longitudinally along a central axis of the fuselage;
the exterior surface is angled, relative to the central axis, at the second axial locations;
each one of the plurality of fan blades rotates about a rotational axis; and
the rotational axis of each one of the plurality of fan blades is parallel to the exterior surface at the second axial locations.

17. The aircraft of claim 1, wherein:
the fuselage extends longitudinally along a central axis of the fuselage;
each one of the plurality of fan blades rotates about a rotational axis;
the rotational axis of at least one of the plurality of fan blades is angled at a first angle, relative to the central axis;
the rotational axis of at least another one of the plurality of fan blades is angled at a second angle, relative to the central axis; and
the first angle is greater than the second angle.

18. An aircraft, comprising:
a fuselage, comprising an exterior surface and a rearward-most end;
a plurality of control surfaces fixed to the exterior surface of the fuselage at first rearward-most axial locations and extending from the exterior surface of the fuselage at the first rearward-most axial locations; and
a plurality of fans, fixed directly to the exterior surface of the fuselage at second axial locations forward of the rearward-most end of the fuselage and rearward of the first rearward-most axial locations and positioned about the exterior surface of the fuselage at the second axial locations, the plurality of fans grouped into a plurality of fan pods comprising at least two fans, wherein the at least two fans of each one of the plurality of fan pods are spaced closer to each other than the fans of adjacent ones of the plurality of fan pods, each one of the plurality of fans comprising:
a plurality of fan blades; and
a fan drive, configured to rotate the plurality of fan blades, wherein the plurality of fan blades are positioned at lateral locations relative to the exterior surface of the fuselage such that when rotated by the fan drive the plurality of fans receive and accelerate fuselage boundary layer air flow, along the exterior surface of the fuselage, from a first average velocity to a second average velocity, greater than the first average velocity, when the aircraft is in flight.

19. A method of boundary layer ingestion during flight of an aircraft, the method comprising:
rotating a plurality of fan blades of each one of a plurality of fans when the aircraft is in flight, the plurality of fans fixed directly to an exterior surface of a fuselage at first axial locations and positioned about the exterior surface of the fuselage at the first axial locations, wherein the first axial locations are forward of a rearward-most end of the fuselage and rearward of second rearward-most axial locations at which a plurality of control surfaces are fixed to the exterior surface of the fuselage and at which the plurality of control surface extend from the exterior surface of the fuselage;
drawing a boundary layer air flow, at a first average velocity, into the plurality of fan blades of each one of the plurality of fans, when the plurality of fan blades are rotating; and
expelling the boundary layer air flow from the plurality of fan blades of each one of the plurality of fans at a second average velocity, greater than the first average velocity.

20. The method of claim 19, wherein the step of rotating a plurality of fan blades of each one of the plurality of fans further comprises rotating the plurality of fan blades of each one of the plurality of fans grouped in a plurality of fan pods, each one of the plurality of fan pods comprising at least two fans and the at least two fans of each one of the plurality of fan pods spaced closer to each other than the fans of adjacent ones of the plurality of fan pods.

* * * * *